(No Model.)
M. F. CORLEY.
HEAD PROTECTOR FOR HORSES.
No. 342,186. Patented May 18, 1886.
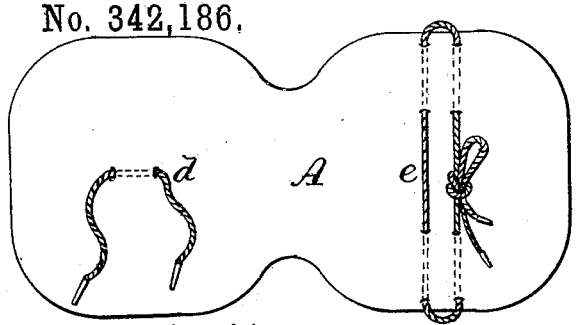
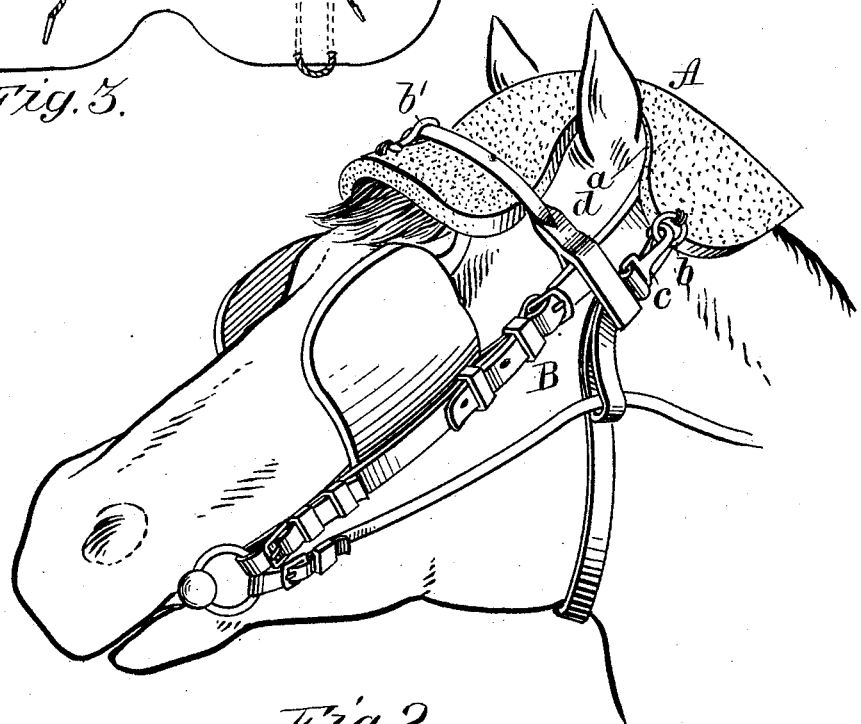
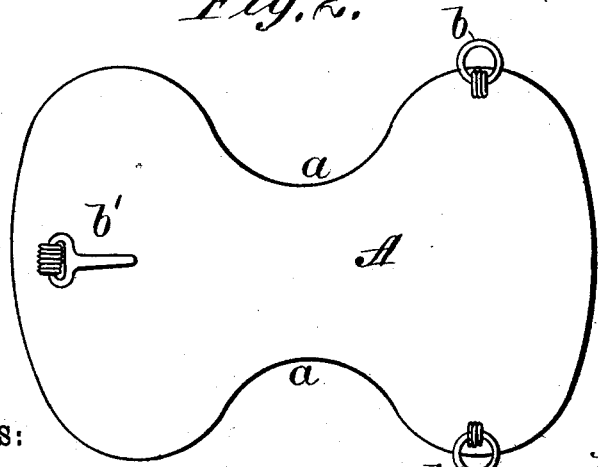
WITNESSES:
J. D. Garfield
C. Sedgwick
INVENTOR:
M. F. Corley
BY Munn & Co.
ATTORNEYS.

United States Patent Office.

MARTIN FRANCIS CORLEY, OF LA SALLE, ILLINOIS.

HEAD-PROTECTOR FOR HORSES.

SPECIFICATION forming part of Letters Patent No. 342,186, dated May 18, 1886.

Application filed February 18, 1886. Serial No. 192,353. (No model.)

*To all whom it may concern:*

Be it known that I, MARTIN FRANCIS CORLEY, of La Salle, in the county of La Salle and State of Illinois, have invented a new and useful Improvement in Head-Protectors for Horses, of which the following is a specification, reference being had to the annexed drawings, forming a part thereof, in which—

Figure 1 is a perspective view, showing the application of my improved protector to the head of a horse. Fig. 2 is a plan view, and Fig. 3 is a plan view showing string fastenings.

Similar letters of reference indicate corresponding parts in all the figures of the drawings.

The object of my invention is to provide a simple and efficient device for protecting the heads of horses against the effects of the rays of the sun.

My invention consists in forming a head-protector for horses from thick felted fabric.

I have discovered by long experience that felted fabric will retain moisture for a long time after being saturated, and, moreover, the water will not drip from the saturated fabric upon the horse's head. I have also discovered that when moist or wet the felted fabric will retain its shape; therefore I have a protector embodying the most valuable prerequisites of such an article, as it is porous, flexible, non-breakable, and will evenly distribute the moisture without wetting the horse's head.

Heretofore head-protectors have been formed upon a frame-work of wire and have contained wetted bran, sponge, &c.; but head-protectors formed on a stiff frame-work are liable to be broken, bent out of shape, and rubbed from the horse's head, and the wet bran would sour in a few minutes and draw flies and other insects, while a sponge will constantly drip when saturated with water. The felt protector will soon take the shape of the horse's head and will retain it indefinitely.

Referring to the drawings, A represents the protector formed of a thick piece of felted fabric having rounded notches $a$ $a$ on its opposite sides between its ends, the width of the fabric between the notched portions being about equal to the distance between a horse's ears, to admit of placing the protector upon the horse's head between and before and behind the ears, as shown in Fig. 1. Rings $b$ $b$ are secured to the sides of the protector in rear of the notches, and a snap-hook is secured to the protector on its upper side in front of the notches, so that the snap-hooks $c$ and brow-band of the bridle B may be engaged, as shown in Fig. 1; but my preferred manner of securing the protector to the bridle is by means of the cords shown in Fig. 3, where $e$ represents a cord passed transversely across and through the fabric to form end loops, the ends of the cord being tied so that the cord may be adjusted to form long or short loops in applying the protector to different sized heads. The front part of the protector may also have a similarly-arranged cord; but I have shown a cord, $d$, passed longitudinally through a portion of the fabric in front of the notches to engage the brow-band adjustably. The loops formed by the cord $e$ are intended to engage the snap-hooks $c$ or the rosettes on the bridle.

Having thus described my invention, what I claim as new, and desire to secure by Letters Patent, is—

1. As an improved article of manufacture, the head-protector for horses, formed of felted fabric, substantially as described, and provided with attaching devices, substantially as set forth.

2. A head-protector for horses, formed of felted fabric having its sides notched, as at $a$ $a$, and the front and rear attaching-cords, substantially as set forth.

3. A head-protector for horses, consisting of the piece A, notched at $a$ $a$, the cord $e$, extending transversely across and through the fabric, as shown, to form loops, the ends of the cord being adapted to be tied to adjust the length of the loop, and the cord $d$ in front of the notches, substantially as set forth.

MARTIN FRANCIS CORLEY.

Witnesses:
 THOS. N. HASKINS,
 TIMOTHY DOUGLASS.